United States Patent [19]

Fillmore

[11] 4,229,749

[45] Oct. 21, 1980

[54] INK DROP COMPENSATION BASED ON PRINT-DATA BLOCKS

[75] Inventor: Gary L. Fillmore, Boulder, Colo.

[73] Assignee: International Business Machines Corporation, Armonk, N.Y.

[21] Appl. No.: 23,813

[22] Filed: Mar. 26, 1979

[51] Int. Cl.[3] .............................................. G01D 15/18

[52] U.S. Cl. .............................................. 346/75

[58] Field of Search .............................................. 346/75

[56] References Cited

U.S. PATENT DOCUMENTS

| | | | |
|---|---|---|---|
| 3,631,511 | 12/1971 | Keur | 346/75 |
| 3,789,422 | 1/1974 | Haskell | 346/75 |
| 3,828,354 | 8/1974 | Hilton | 346/75 X |
| 3,946,399 | 3/1976 | Zaretsky | 346/75 X |
| 4,032,924 | 6/1977 | Takano | 346/75 |

OTHER PUBLICATIONS

Bengds et al., Ink Printer . . . for Charge Compensation; IBM Tech. Disc. Bulletin, vol. 16, No. 11, Apr., 1974, pp. 3550-3552.

Nguyen, N. N., Storing and Computing . . . in a High-Speed Ink Jet Printer, IBM Tech. Disc. Bulletin, vol. 21, No. 4, Sep., 1978, pp. 1540-1542.

*Primary Examiner*—Joseph W. Hartary

*Attorney, Agent, or Firm*—Homer L. Knearl

[57] ABSTRACT

The invention relates to an ink jet printer and in particular to correcting the flight path of drops from the printer to reduce print position error on the print media. It has been found that drops as far as 30 drop positions ahead of a drop in the ink stream can have an effect on the flight path of that drop to the print media. Using a memory to store $2^{30}$ compensation values to correct the flight of the drop for all possible combinations of drop patterns in the ink stream is not practical. Disclosed herein is a method and apparatus for using a smaller number of compensation values to correct the flight path for all possible combinations. This is accomplished by grouping the drops remote in position from the drop being compensated into blocks of drops and treating the entire block of drops as contributing one effect on the flight of the drop. Accordingly, drops close to the compensated drop are treated as having an individual effect on the flight path while drops remote from the compensated drop are grouped into one of more blocks and each block is treated as having a single effect on the compensated drop.

17 Claims, 10 Drawing Figures

INK DROP COMPENSATION BASED ON PRINT-DATA BLOCKS

DESCRIPTION

1. Field of the Invention

This invention relates to an apparatus for correcting the flight path of an ink drop in an ink jet printer to obtain precise printing. More particularly, the invention relates to correcting the flight path of ink drops to compensate for the effects of charge repulsion between ink drops, induced charges on the ink drops and aerodynamic drag on the ink drops.

2. Background Art

The three effects that can change the flight path of an ink drop in an ink jet printer are charge repulsion between drops, charge induction between drops and aerodynamic drag. The ink drop is charged as it breaks off from the ink stream. This is typically accomplished by grounding the ink, which is conductive, and surrounding the ink stream at the drop breakoff point with a charge ring connected to some predetermined voltage. The voltage between the ink stream and the charge ring creates electrical charges in the ink stream which are trapped in the drop as the drop breaks off from the stream. The magnitude of this charge trapped on the drop is used to control the flight path of the drop by placing an electric field in the flight path to deflect the charged drop. Thus, a change in the voltage potential applied to the charge ring can change the charge in the drop and the flight path of the drop.

Charge induction errors in the flight path are caused by previously charged drops in the vicinity of the drop breakoff point inducing a charge on the drop currently breaking off. The charge placed on a drop is predominantly controlled by the charge ring but an error charge can be placed on the drop due to a previously charged drop near the drop breakoff point. The error in charging the drop then causes an error in the flight path of the drop to the print media.

The charge repulsion error effect is created by drops of the same charge repelling each other as they fly towards the print media. The repelling forces between the drops change their flight paths and thus change the point at which the drops strike the media creating an error in printing.

The aerodynamic drag on a drop can change the flight time of a drop to the print media. The faster the print media is moving relative to the drop stream, then the greater will be the errors in print position due to changes in flight time of a given drop. The amount of drag experienced by a drop depends upon the pattern of drops flying in front of the print drop or reference drop.

Each of the above three effects can create errors in precision ink jet printing. Which effect is dominant largely depends on the distance from the drop breakoff point to the print media and the relative velocity between the ink drops and the print media. If the velocity of the print media is slow relative to the ink drop velocity the predominant errors in printing are due to charge induction and charge repulsion. As the flight time of ink droplets increase and as the velocity of the print media relative to the droplets increase, aerodynamic drag becomes the more predominant source of error in printing. This is especially true in a binary ink jet system using uncharged drops as the print drops and charged drops as the gutter drops. Since the uncharged drops are the print drops the error effects due to induced charges and charge repulsion are small compared to the errors due to the aerodynamic drag on the drops.

In addition, the error effect of induced charges or charge repulsion is limited to substantially the three or four drops immediately in the vicinity of the reference drop. It is known for example that the charge induction effect falls off nonlinearly with distance from the reference drop (drop breaking off). The fourth drop away from the reference drop is the last drop that usually needs to be considered (for example, see U.S. Pat. No. 4,032,924, issued to Takano et al on June 28, 1977). Similarly, the charge repulsion effect between drops decreases as an inverse function of the squared distance between the drops. Thus, the charge repulsion effect on print error need be considered only for drops immediately in the vicinity of the reference drop.

On the other hand, the aerodynamic error effect, when it is predominant has been found to be a long term effect. In some situations drops in excess of 30 drop positions in front of the reference drop can have an effect on the aerodynamic drag on the reference drop.

Examples of apparatus compensating for induced charges are taught in U.S. Pat. Nos. 3,631,511 and 3,789,422. The Keur et al Pat. No. 3,631,511 issued on Dec. 28, 1971, teaches correcting the reference drop for induced charge from the immediately preceeding drop. The Haskell et al U.S. Pat. No. 3,789,422 issued Jan. 29, 1974, teaches compensating for charge effects based upon any number of previously charged drops.

U.S. Pat. Nos. 3,828,354 and 3,946,399 teach compensating for the error effects due to charges and aerodynamic drag. The Zareski U.S. Pat. No. 3,946,399 issued on Mar. 23, 1976, teaches monitoring the data pattern for an ink jet stream to detect particular print data patterns. These print data patterns are then logically analyzed to select a compensation charge signal to be applied to the charge ring. The Hilton U.S. Pat. No. 3,828,354 issued on Aug. 6, 1974, teaches monitoring a seven bit print data pattern to generate the compensation signal for aerodynamic and charge induced effects. Hilton monitors four drops ahead of the reference drop two drops behind the reference drop and the reference drop itself. Based upon the binary pattern for these seven drops, Hilton addresses a read-only-store memory which contains predetermined compensation values for each possible address.

None of the above patents teach compensating for the relatively long term aerodynamic drag effects. One problem in trying to correct for such effects is the number of patterns to be corrected for. If drops as far as 30 drop positions away from the reference drop have an effect, then the number of possibilities requiring correction are $2^{30}$. Clearly storing a charge compensation value for each and every possibility is not practical.

SUMMARY OF THE INVENTION

It is the object of this invention to correct the flight path of an ink drop to compensate for all error causing effects including long term aerodynamic drag effects.

In accordance with this invention, the above object is accomplished by compensating the reference drop for each and every drop in immediate proximity to the reference drop and summarizing the effect of groups of drops more remote from the reference drop. The immediate effects of charge repulsion, charge induction and aerodynamic drag are compensated for drop by drop for drops a few drop periods preceeding and one drop period trailing the reference drop. Drops more remote are grouped in accordance with the magnitude of their error effect.

The long term aerodynamic drag effect decreases nonlinearly with distance from the reference drop. Drops more further removed from the reference drop may be grouped into larger and larger groups for the purpose of making a compensation correction decision. Accordingly, this invention can correct for all flight path errors in an ink jet printer while maintaining a practical limit on compensation apparatus. For example, the necessity of making $2^{32}$ compensation corrections can be reduced to making $2^{11}$ compensation corrections while maintaining precise ink jet printing.

BRIEF DESCRIPTION OF DRAWINGS

FIG. 1 shows one embodiment of the invention wherein the print data for the drops more remote from the reference print drop are grouped into three blocks of increasing size to reduce the number of print data patterns compensated for.

DETAILED DESCRIPTION

Figure 1:
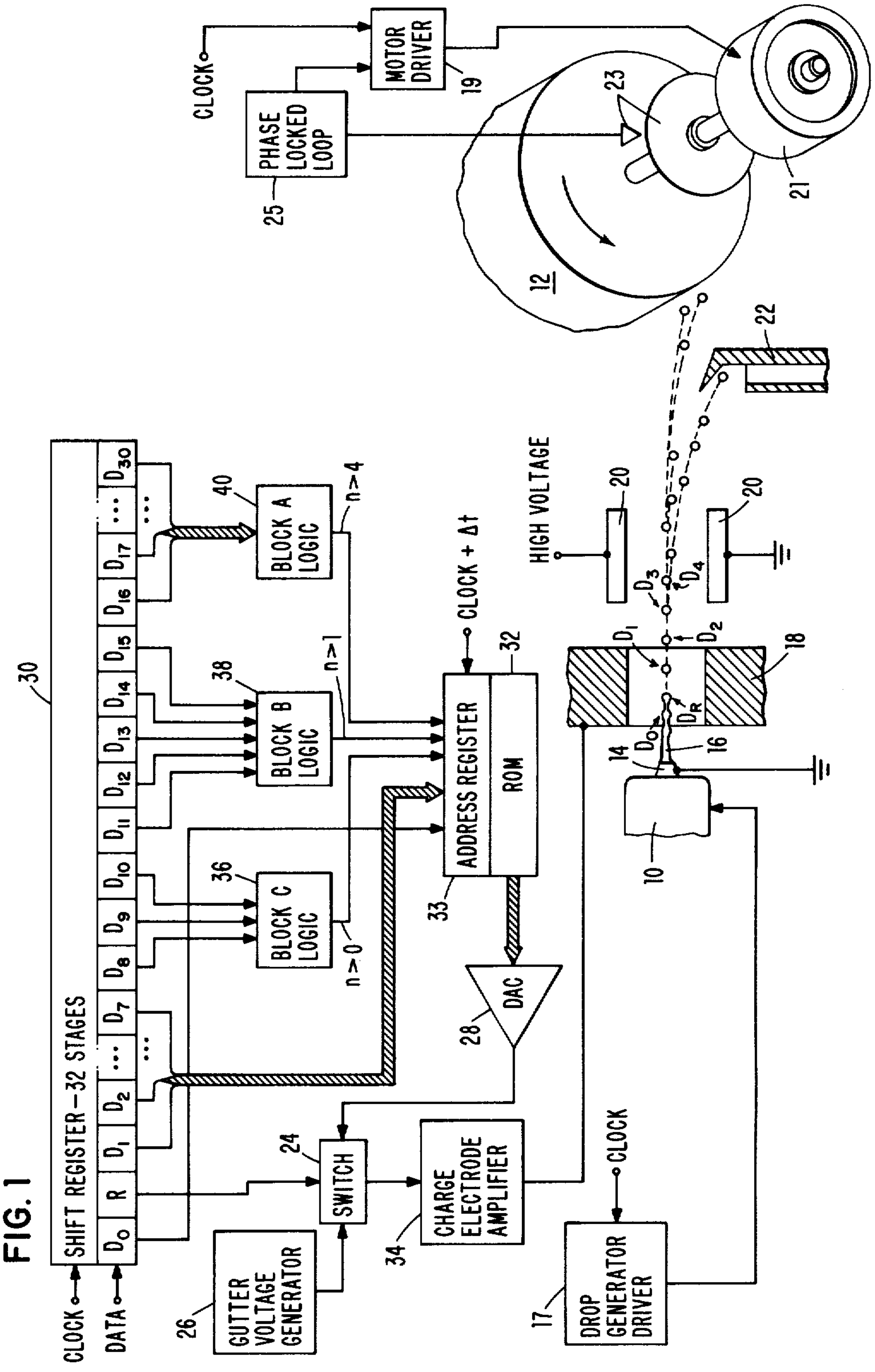

In the embodiment of FIG. 1 ink jet head 10 is printing on a media mounted on drum 12. As drum 12 rotates ink jet head 10 is indexed parallel to the axis of the drum so as to print the entire page mounted on the surface of the drum 12. Ink in the head 10 is under pressure and thus issues from the nozzle 14 as an ink stream. In addition, a transducer in the head 10 provides a vibration in the ink cavity inside head 10. This vibration or pressure variation in the ink causes the stream 16 to break-up into droplets.

The transducer in head 10 is driven by drop generator driver 17. The clock signal applied to driver 17 controls the frequency of the drops and the drop period—distance between drops. To synchronize the system, the clock signal is also applied to the shift register 30 and to the drum motor driver 19. Shift register 30 is shifted by the leading edge of the clock signal. The speed of drum 12 and motor 21 is held steady to the clock by feedback from tachometer 23 through phase locked loop circuit 25 to motor driver 19.

Change ring 18 surrounds the ink stream 16 at the point where the ink stream breaks into droplets. Nozzle 14 and ink 16 are electrically conductive. With nozzle 14 grounded and a voltage on charge ring 18, electrical charges will be trapped on the ink droplet as it breaks off from stream 16.

As the droplets fly forward they pass through an electrical field provided by deflection electrodes 20. If the drops carry a charge they are deflected by the electrical field between electrodes 20. Highly charged drops are deflected into a gutter 22, while drops with little or no charge fly past the gutter to print a dot on the media carried by drum 12. Ink caught by gutter 22 may be recirculated to the ink system supplying ink to head 10.

In the embodiment in FIG. 1 the print drops have no charge placed on them due to data. If there were no error effects, the print drops would be uncharged. However, because of the error effects, compensation charge is applied to the print drops. This compensation charge varies from print drop to print drop depending upon the correction required to obtain the proper flight path to the media on the drum 12.

The charge voltage applied to charge ring 18 is either a gutter (no-print) voltage or a compensation voltage. Switching circuit 24 receives the gutter print voltage from gutter voltage generator 26 and the compensation voltage from digital to analog converter 28. A zero bit in the reference drop R position of shift register 30 indicates the reference drop $D_R$ should be guttered. Accordingly, a binary zero from the reference drop stage of shift register 30, causes switch 24 to connect the gutter voltage generator 26 to the charge electrode amplifier 34. On the other hand, if the reference drop is to be printed, the R stage in shift register 30 will have a binary one stored therein. A binary one applied to switch 24 causes the switch to connect the compensation signal from the digital-to-analog converter 28 to the charge electrode amplifier 34.

Digital-to-analog converter 28 receives a digital compensation signal from the read only memory 32. The size of the digital word from memory 32 depends upon the capacity of the memory. Typically a 9 bit word representative of a compensation signal with 512 possible levels might be used.

The 9 bit word is converted into an analog signal by the converter 28 and applied to the switch 24. The signal from switch 24 is amplified by the charge electrode amplifier 34 and applied to the charge ring 18.

To generate the compensation signal, read only memory 32 contains $2^{11}$ memory addresses with each address containing a compensation voltage for a particular print data pattern of drops. In the embodiment of FIG. 1, one drop is monitored behind the reference drop and 30 drops are monitored in front of the reference drop. The shift register 30 thus has 32 stages to temporarily store the print data for the reference drop and the additional 31 drops being monitored. Drop $D_0$ is the trailing drop. Drops $D_1$ to $D_{30}$ are the drops immediately preceeding the reference drop $D_R$. Since FIG. 1 is a schematic representation and not to scale, the distance shown from the reference drop $D_R$ to the print drum 12 is not 30 drops. In actual operation the distance would be in excess of 30 drop periods (a drop period in distance equals the velocity of the drops multiplied by the period of the drop generation frequency).

Leading drops $D_1$ to $D_7$ and trailing drop $D_0$ are applied individually to the address register 33 for read only memory 32 at clock $+\Delta t$ time. The time, clock $+\Delta t$, occurs a short time after the shift register 30 has shifted but before the reference drop $D_R$ breaks off during the clock cycle. Each of these drops is close enough to the reference drop $D_R$ so that each variation in their print data pattern has a significant individual error effect on the flight time of the reference drop. The quantity of leading drops for which an individual correction is made is a design trade-off between the size of the memory 32 and the effect that the next most remote drop has on the reference drop.

One guideline that may be used to determine when to start grouping the leading drops is as follows. If the last drop which is individually corrected for has an error effect on the reference drop that requires a compensation signal of z volts, then the next n number of drops, which together are responsible for a correction of z volts can be grouped together into a single compensation bit decision. This is only one of many ways in which to select the grouping of drops for making a block compensation signal. Other alternatives will be discussed hereinafter.

In the embodiment of FIG. 1, the remaining leading drops are grouped as follows. Block or group A includes leading drops $D_{16}$ through $D_{30}$. Block B includes drops $D_{11}$ through $D_{15}$. Block C includes drops $D_8$, $D_9$ and $D_{10}$. Each of these blocks is responsible for generating one bit of the address used by address register 33 in read only memory 32. In FIG. 1 the criteria for designating a block as a one or zero address bit based on the print data in the block is indicated at the output of each block logic. For block C logic 36, if any of the drops $D_8$ to $D_{10}$ are a print drop then the Block C logic will have a one output. In other words, n is greater than O where n is the number of binary ones in block C. The block C logic 36 could simply be an OR circuit to generate an output binary one in the event any of the stages $D_8$, $D_9$, or $D_{10}$ of register 30 contains a binary one.

The block B logic 38 monitors stages $D_{11}$ through $D_{15}$ of shift register 30 for a total number of binary ones in excess of one. If two or more of the drops $D_{11}$ through $D_{15}$ are print drops, block B logic 38 will have a binary one output. Similarly, block A logic 40 monitors stages $D_{16}$ through $D_{30}$ of the shift register 30 for a total of binary one's greater than 4. Thus, if 5 or more of the drops $D_{16}$ through $D_{30}$ are print drops, block A logic 40 will have a binary one output.

Figure 2:
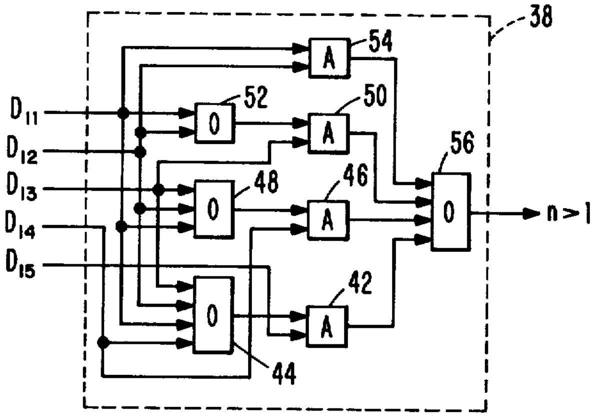
FIG. 2 shows one example of logic that can be used to implement the block B logic in FIG. 1.

An example of the logic to implement block B logic 38 is shown in FIG. 2. AND gate 42 in combination with OR circuit 44 looks for a print condition for drop $D_{15}$ in combination with a print condition for any of the drops $D_{11}$ through $D_{14}$. AND gate 46 in combination with OR circuit 48 looks for a print condition for drop $D_{14}$ in combination with a print condition for any of the drops $D_{11}$ through $D_{13}$. Similarly, AND gate 50 in combination with OR 52 looks for a print condition on drop $D_{13}$ in combination with a print condition on drop $D_{11}$ or $D_{12}$. Finally, AND gate 54 looks for the combination of drops $D_{11}$ and $D_{12}$ being printed. All of these possibilities are logically collected by OR 56 to generate the n greater than 1 indication as the output from block B logic 38. Of course, any number of logic designs might be used to determine 2 or more of the droplets $D_{11}$ through $D_{15}$ are print drops.

A variety of techniques may be used to determine the number of ones in a block or group which are necessary before assigning a single bit code to the output of a group. The criteria, n greater than 0 for block C, n greater than 1 for block B, and n greater than 4 for block A, were all determined empirically. The test procedure involved monitoring the compensation voltage necessary to bring a print drop to the correct position for particular patterns. The patterns chosen for each block were consecutive print drops from 0 up to the maximum size of the block with the consecutive drops being centered in the block. All drops, other than the reference drop, outside the block of drops being observed were gutter drops. A correction voltage for each pattern in each block was taken. The maximum and minimum correction voltages were averaged. Patterns requiring a correction voltage less than the average value were then designated as a one bit for the group. Patterns requiring a correction greater than the average value were then designated as a zero bit for the group. For example, in the Block A Logic if the number of print drops was 4 or less, the correction voltage was greater than the average correction voltage for the block. If the number of print drops was 5 or greater, then the correction voltage was less than the average for the block.

This criteria for designating when to change the compensation value for a block has produced a substantial improvement in the print quality produced by the ink jet printer. An analysis of print error distributions leads to other embodiments of the invention producing high quality printing.

Figure 3:
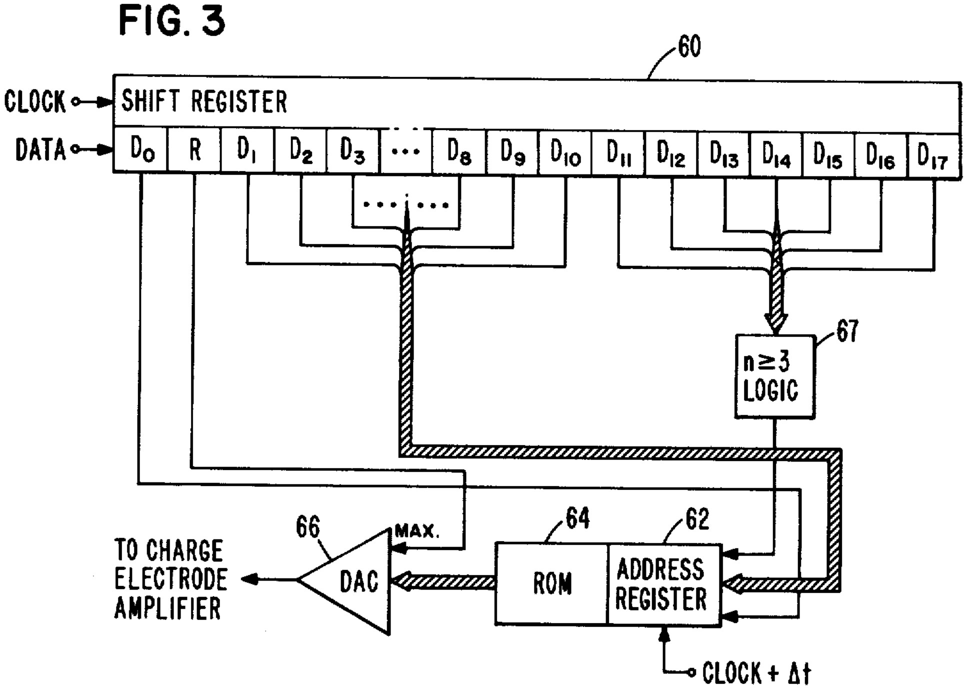
FIG. 3 shows a simpler alternative embodiment of the invention wherein only one block of remote print data is combined to reduce the print data patterns used to retrieve the compensation signal to be applied to the charge electrode.

FIG. 3 shows a simplified embodiment of the invention with a single grouping of the most remote drops. With the limitation of a 4K memory for storing compensation values, this embodiment has achieved some of the lowest worst case print error, print samples. The limitation of a 4K memory means that the number of address bits that can be used to access the memory are 12 bits. This, in turn, means that the number of drops that can be monitored is 12, or a fewer number of drops individually can be monitored with additional drops monitored as groups or blocks. In FIG. 3 the trailing drop and the ten drops immediately preceding the reference drop are monitored individually. An additional seven drops (drops $D_{11}$ through $D_{17}$) proceeding the reference drop are monitored as a group.

The operation of the embodiment in FIG. 3 is substantially the same as the operation of FIG. 1. The print data for drops in the ink stream are buffered in shift register 60. Trailing drop $D_0$ and preceding drops $D_1$ through $D_{10}$ are applied directly to the address register 62 of read only memory 64. Drops $D_{11}$ through $D_{17}$ are analyzed by logic 67. Logic 67 generates a binary one if three or more of the droplets $D_{11}$ through $D_{17}$ are print drops, i.e., binary one stored in at least three of the shift register positions $D_{11}$ through $D_{17}$.

As in FIG. 1, the shift register is shifted at the beginning of each drop clock cycle. Shortly thereafter (clock plus $\Delta t$) the values from the shift register 60 and the logic 67 output are loaded into the address register 62. Thus the address register 62 is loaded with a new pattern address prior to the breakoff time. The compensation value retrieved by the address in the address register is a 9-bit value which is passed to the digital-to-analog converter 66. The nine bits can then be converted by converter 66 to one of 512 analog values. These analog compensation values are amplified by the charge electrode amplifier and applied to the charge electrode (FIG. 1).

If the reference drop bit is a binary zero (gutter drop), the gutter voltage is generated by digital-to-analog converter 66. The binary zero from the reference drop bit signals converter 66 to generate its maximum output voltage irrespective of the value from ROM 64. The drop is charged with the maximum voltage and deflected to the gutter as shown in FIG. 1. If the reference drop is a print drop—binary one—converter 66 willgenerate the charge electrode voltage based on the compensation value received from memory 64.

Figure 4:
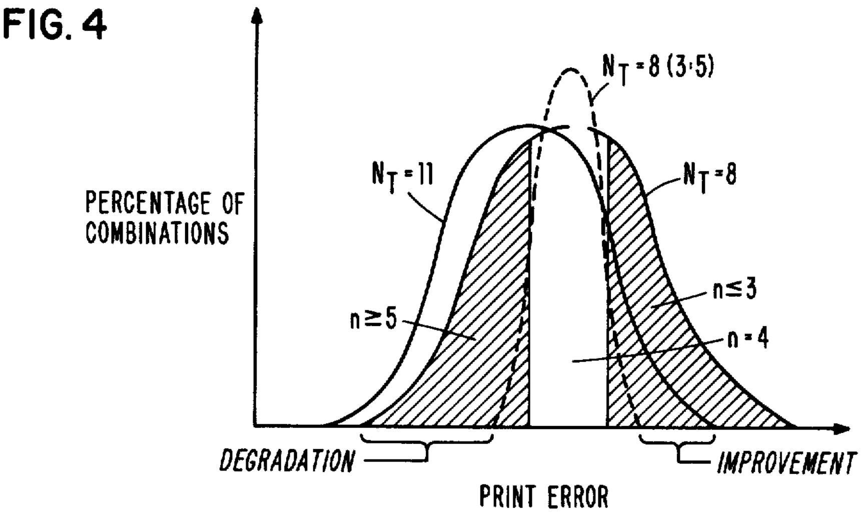
FIG. 4 is a graph of print error distributions for different size data pattern samples.

An analysis of print error distribution, as a function of the total number, sample size $N_T$, of droplets preceding the reference drops that are individually monitored and as a function of print density, leads to an alternative embodiment of the invention which further improves the print quality. FIG. 4 is a graph of print error values versus the number of print combinations producing the error value for various sample sizes $N_T$. Each curve of function represents a different $N_T$. As will be described hereinafter, this analysis shows that further improvement in print quality can be achieved by dynamically adjusting the blocking depending upon the pattern of print data for droplets preceding the reference drop.

The curves in FIG. 4 are representative and not precise. The $N_T=11$ curve indicates the distribution of the print error when 11 drops preceding the reference drop are individually monitored. The $N_T=8$ curve indicates the distribution of the print error when 8 drops preceding the reference drop are monitored. Generally, as fewer drops are monitored, the distribution curve becomes flatter and wider and the center point or highest number of combinations is at a point further out on the print error axis in the graph.

From the standpoint of print quality, it is the right-hand portion of the distribution curves that represents the most objectionable errors on the printed page. Print errors in the left-hand portion of the error distribution curve tend to not be visible to the eye while those in the right-hand portion stand out on the printed page. The curves show that if a very large memory were available so that more drops could be monitored individually, the print error distribution could be squeezed down to a spike and moved left on the graph to or near zero print error. Of course, such a system is not practical because of the large size memory required. Within the limitation of a 4K memory, only 12 drops can be monitored. As previously discussed, fewer drops immediately preceding the reference drop could be monitored individually and more remote drops monitored as groups.

In FIG. 4, choosing to monitor 8 drops individually instead of 11 drops moves the print error distribution to the right. However, the print error distribution for $N_T=8$ can be divided into regions based upon print density, the number of print drops in the eight bit sample. The cross-hatched region in the right-hand portion of the curve represents all combinations where the number of print drops is equal to or less than 3 ($n \leqq 3$) a low print density. The left-hand cross-hatched portion in $N_T=8$ represents all print drop combinations where five or more of the eight drops are print drops ($n \geqq 5$) a high print density. The $n \geqq 5$ portion of the distribution confirms the expectation that if a large number of the drops adjacent the reference drop are print drops, they provide an aerodynamic shield for the reference drop as it travels to the print media. Conversely, if three or less of the drops out of the eight drops are print drops, there is much less shielding for the reference drop as it flies to the print media, and the print error increases.

If storage locations in memory for the patterns where $n \geqq 5$ could be borrowed and given to the patterns where $n \leqq 3$, it would be possible to lower the worst case print error. Stated another way, the drops more remote than 8 drops from the reference drop have a stronger effect when three or less of the drops in the eight drops proceeding the reference drop are print drops. Therefore, for all cases where five or more of the drops in the first eight are print drops, only pattern changes in the eight drops will be monitored to address the read only memory for charge correction values. The memory saved by not using bits 9, 10 and 11 may then be used to store more correction values when three or fewer of the first eight drops are print drops.

Referring again to FIG. 4, the dashed curve for $N_T=8(3:5)$ shows a print error distribution for the above memory swap method. In effect, the $N_T=8$ waveform is squeezed to form the $N_T=8(3:5)$ waveform. As a result, there is an improvement in worst case error as compared against $N_T=11$ waveform, but there is also a degradation in the smaller print errors. Since the larger print errors are the most visible to the eye, this is an attractive tradeoff for improving overall print quality.

In effect, the memory space swapping divides the $N_T=8$ waveform into three portions requiring different optimum print error pattern monitoring for optimum use of the memory for storing compensation values. A first mode for addressing the memory would be where five or more of the droplets in the first eight drops preceding the reference drop are print drops. A second mode would be where four of the droplets of the first eight preceding the reference drop are print drops. Finally, the third mode would be where three or less of the drops of the first eight drops are print drops. In other words, depending upon the number of print drops in the first eight drops, the pattern monitored in the print data and the blocking or grouping of print data to address the memory may be dynamically changed.

Figure 5:
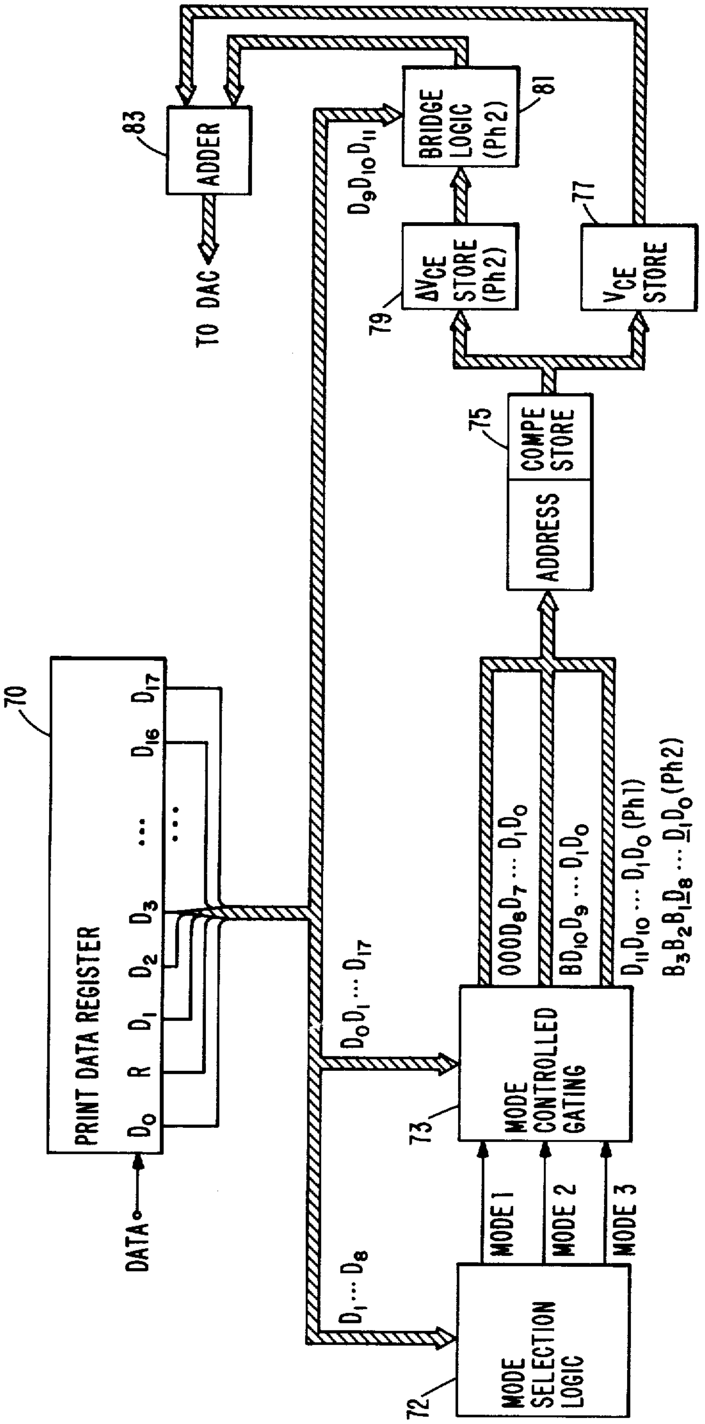
FIG. 5 shows another embodiment of the invention wherein the grouping of print data is dynamically changed depending upon the print data patterns.

Apparatus to implement dynamic grouping of the print data is shown in FIG. 5. This apparatus divides the $N_T=8$ curve into the three portions shown in FIG. 4. To do this the eight droplets immediately preceding the reference drop have their print data monitored by a mode selection logic 72. Print data register 70 contains the print data for the reference drop R, one trailing drop $D_0$ and 17 drops $D_1$–$D_{17}$ preceding the reference drop.

Mode controlled gating 73 responds to the mode signals from logic 72 to form the addresses used by the compensation storage device 75. In the embodiment of FIG. 5, storage device 75 is addressed by 12 bits. The 12 bits are formed by the mode control gating 73 from the print data bits in the print data register 70.

The mode control gating circuits receive data bits $D_0$ and $D_1$ through $D_{17}$ from the print data register. In mode 1, where the number of binary one's in $D_1$ through $D_8$ is equal to or greater than five as signalled by the mode selection logic 72, the gating circuits use $D_0$ and $D_1$ through $D_8$ as the address for the storage device 75. The last three bits in the address are set to zero. Setting these three bits to zero saves memory space which can be subsequently used during mode 3.

In mode 2, where the number of binary one's in $D_1$ through $D_8$ is equal to 4, the mode controlled gating circuits group the print data bits from $D_{11}$ through $D_{17}$. These data bits are formed into a single data bit B for the entire group or block. Accordingly, in mode 2 the gating circuit 73 form the address for storage 75 as $D_0$, $D_1$ through $D_{10}$ and bit B.

In mode 3, where the number of binary one's in $D_1$ through $D_8$ is less than or equal to three, the gating circuits 73 make use of the memory locations saved during mode 1. Further, mode 3 operates in two phases or two levels of addressing of the storage device 75. In the first phase of addressing, the gating circuit 73 simply uses data bits $D_0$ and $D_1$ through $D_{11}$ to address the storage device 75. The compensation value addressed is loaded into $V_{CE}$ storage device 77. The gating circuits then proceed to the second phase of addressing if two conditions exist in the print data—$D_9$, $D_{10}$, and $D_{11}$ are not all binary one's and $D_{12}$ through $D_{17}$ are not all binary zeros. If either of these conditions occur, then mode 3 addressing stops at phase 1. This in effect says that under these conditions looking for fluctuations in data patterns at more remote drop positions is not necessary.

Phase 2 or second level addressing during mode 3 proceeds if $D_9$, $D_{10}$ and $D_{11}$ are not all binary one's and if there are any binary one's in $D_{12}$ through $D_{17}$. The address in phase 2 is generated by inverting data bits $D_1$ through $D_8$ and pairing data bits $D_{12}$ through $D_{17}$ into three block bits; $B_1$, $B_2$ and $B_3$. The trailing bit data bit $D_0$ is also used at the first bit position in the address. The fact that $B_1$, $B_2$ and $B_3$ bits will have one or more binary ones and the fact that $D_1$ through $D_8$ data bits have been inverted means the second level or second phase address will be identical to the addresses saved during mode 1 on a one-to-one basis.

To use the compensation values accessed by the addresses generated by gating circuit 73, storage devices 77 and 79, bridging logic 81 and adder 83 are used. In all situations except mode 3, phase 2, the final compensation value is stored in the $V_{CE}$ storage device 77. From there the $V_{CE}$ is passed through adder 83 to be applied eventually to the charge electrode. In mode 3, phase 2, adder 83 adds a $\Delta V_{CE}$ increment to the $V_{CE}$ voltage. This is accomplished by loading compensation values from storage device 75 into the $\Delta V_{CE}$ storage device 79 during phase 2 of mode 3.

Each mode-3 phase-2 address accesses in storage device 75 three incremental compensation values $\Delta V_{CE}$ one of which may be added to the compensation value in storage device 77. Which one of the three $\Delta V_{CE}$ voltages is to be added to the $V_{CE}$ voltage is controlled by bridging logic 81. Bridge logic 81 is so named to reflect the fact that the binary pattern in data bits $D_9$, $D_{10}$, and $D_{11}$ has a bridging effect between the data bits $D_1$ through $D_8$ and data bits $D_{12}$ through $D_{17}$. In other words, the strength of the effect of the pattern of drops $D_{12}$ through $D_{17}$ on the reference drop will depend upon the bridging effect of drops $D_9$, $D_{10}$, and $D_{11}$. Logic 81 selects one of the three $\Delta V_{CE}$ increments from storage device 79 to be added to the charge electrode voltage $V_{CE}$ based upon whether the number of binary one's in $D_9$, $D_{10}$, and $D_{11}$ is zero, one or two.

Thus, the apparatus in FIG. 5 has dynamically selected various print data bit groupings depending upon the print data pattern. Further, those print data combinations producing small errors have had their memory storage space reallocated to those print data patterns which contribute large errors. In this way, the swap of storage space between mode 1 and mode 3 produces an overall reduction in the worst case print error.

Figure 6:
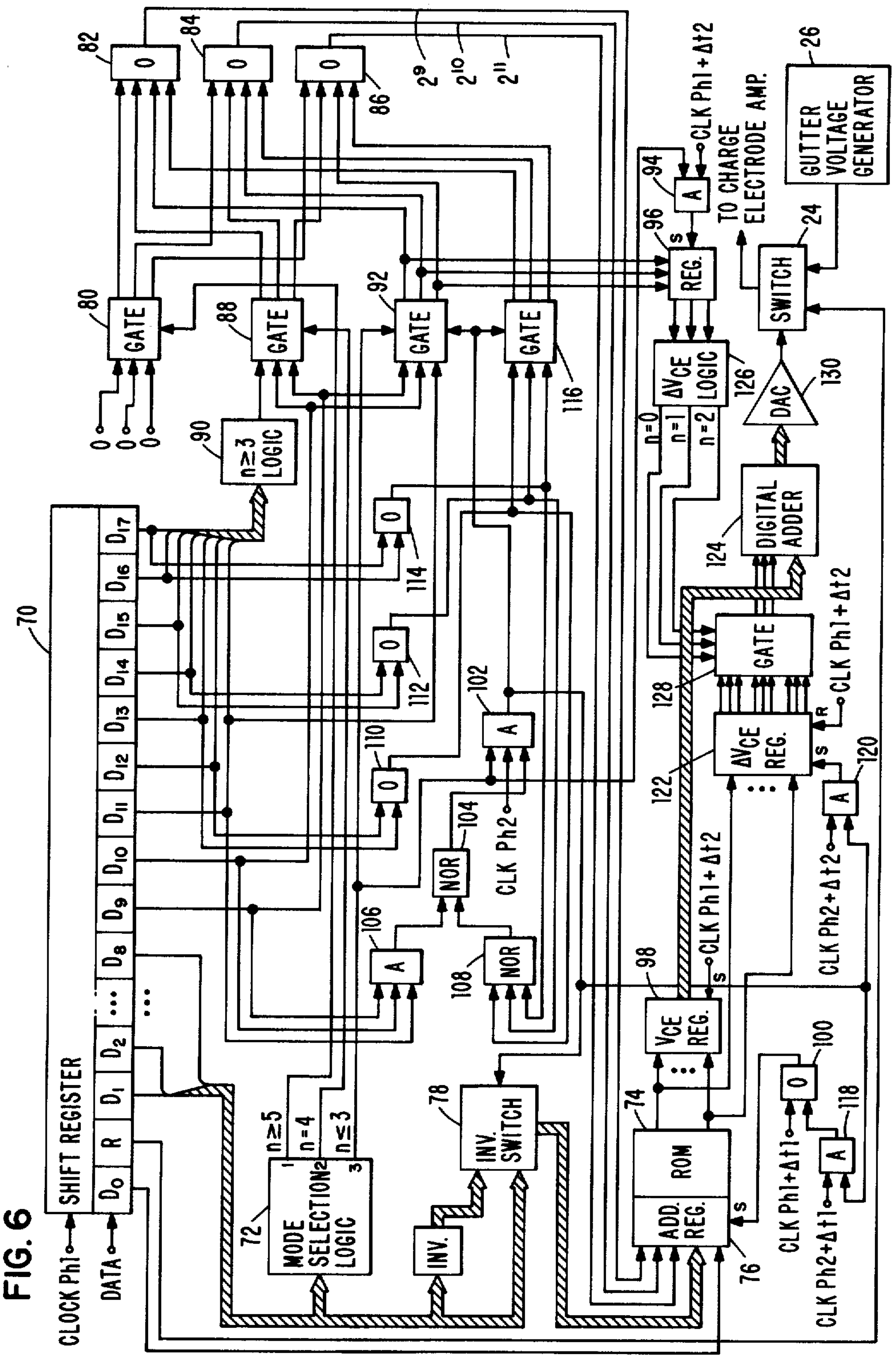
FIG. 6 shows the embodiment of FIG. 5 in more detail.

In FIG. 6, a more detailed drawing of the FIG. 5 embodiment of the invention is shown. Shift register 70 in mode selection logic 72 in FIG. 6 correspond to the print data register 70 and mode selection logic 72 in FIG. 5.

The mode selection logic 72 monitors drops $D_1$ through $D_8$ to detect the three conditions-n greater than or equal to 5, n equals 4 and n less than or equal to 3 where n is the number of binary one's in the print data for droplets $D_1$ through $D_8$. Mode 1 where $n \geqq 5$ utilizes only the variations in print patterns in the first eight drops, $D_1$ through $D_8$, to change the address in the read only memory 74. Mode 2 where $n=4$, treats the trailing drop and the ten drops immediately preceding the reference drop individually and treats drops $D_{11}$ through $D_{17}$ as a group, i.e., mode 2 operates exactly as the apparatus shown in FIG. 3. Mode 3 where $n \leqq 3$ makes use of the addresses saved during mode 1 and changes the data blocking or data grouping of droplets $D_9$ through $D_{17}$ based upon the pattern of drops in $D_9$ through $D_{17}$.

In mode 1 and all other modes, the print data for the trailing drop $D_0$ is passed directly to the zero order position in address register 76. Also, the print data from droplets $D_1$ through $D_8$ is passed to the address register 76 via the invert switch 78. The invert switch 78 is active to invert the print data for droplets $D_1$ through $D_8$ only during mode 3 as will be discussed hereinafter. Normally the invert switch 78 passes the print data for droplets $D_1$ through $D_8$ directly from the shift register 70 to the address register 76.

In addition, in mode 1, the signal line representing the condition $n \geqq 5$ is used to enable gate 80. Gate 80 passes binary zeroes to OR circuits 82, 84 and 86 which in turn pass the binary zeros to the ninth, tenth and eleventh order positions of the address register 76. Thus, in mode 1, the three highest address register positions are forced to zero and this space saved during mode 1 will be subsequently used during mode 3 as hereinafter described.

In mode 2, the print data in the shift register 70 is monitored in the same manner as the print data was monitored in FIG, 3. The mode 2 signal or $n=4$ condition signal is used to activate or enable gate 88. Gate 88 passes the print data bit from $D_9$ to OR circuit 82, from $D_{10}$ to OR circuit 84 and from logic 90 to OR circuit 86. The last address bit is generated from the group analysis of data positions $D_{11}$ through $D_{17}$ by the $n \geqq 3$ logic 90.

The address positions for the ninth, tenth and eleventh order bits in the address register are then passed by OR's 82, 84 and 86 to the address register 76 of the read only memory 74. The first address position in the address register 76 is from the trailing drop position $D_0$ in the shift register 70. The next eight positions in the address register are from drop data positions $D_1$ through $D_8$ in shift register 70. In other words in mode 2, the trailing drop and the ten drops immediately preceding the reference drop are monitored individually while drops $D_{11}$ through $D_{17}$ are grouped into a single data bit for addressing the read only memory 74. This operation is identical to that previously described for FIG. 3.

In mode 3, the read only memory 74 is addressed in two phases or two levels. The blocking or grouping of the data in this two-phase addressing for droplets $D_9$ through $D_{17}$ depends upon the pattern of print data in $D_9$ through $D_{17}$. If $D_9$, $D_{10}$, and $D_{11}$ all contain binary one's, then only one phase of addressing is used during mode 3. Also if droplets $D_{12}$ through $D_{17}$ are all binary zeros, only one phase of addressing is used in mode 3. If neither of these conditions are satisfied, then two phases of addressing are used during mode 3.

In phase 1 of mode 3, gate 92 is enabled to pass the print data from stages $D_9$ through $D_{11}$ to address register 76. Simultaneously binary bits for stages $D_0$ and $D_1$ through $D_8$ are also passed to the address register 76. Thus, the first phase or first level addressing of memory 74 uses the individual data bits for $D_0$ and $D_1$ through $D_{11}$. At clock phase 1 time plus $\Delta t_1$ (Clk Ph $1+\Delta t_1$) AND gate 94 is enabled and provides a set signal for register 96. Register 96 then stores the binary bits for D9, D10 and D11 passed by gate 92. The Clk Ph $1+\Delta t_1$ signal is used so that transients in the logic die out before setting register 96 with the contents of $D_9$, $D_{10}$ and $D_{11}$ from shift register 70. Shift register 70 is shifted by the leading edge of the clock phase 1 (Clk Ph 1) signal. The $\Delta t_1$ interval occurs early during the duration of the clock phase 1 signal.

At clock phase 1 plus $\Delta t_2$ (Clk Ph $1+\Delta t_2$), the compensation value addressed in memory 74 during phase 1 is loaded into a register 98. The $\Delta t_2$ interval occurs during clock phase 1 duration shortly after the $\Delta t_1$ interval pulse occurs during clock phase 1.

Note that address register 76 is set by Clk Ph $1+\Delta t_1$ via OR 100. As a result, the address register is set at $\Delta t_1$ during phase 1 and the compensation value read out from memory 74 is loaded into register 98 at $\Delta t_2$ during phase 1.

In summary, in phase 1 mode 3, at time $\Delta t_1$ print data for $D_0$ through $D_{11}$ are loaded into the address register 76. At phase 1 $\Delta t_2$ time, the compensation value for this first level addressing of memory 74 is stored in register 98. Also register 96 is set at $\Delta t_2$ time to store the contents of $D_9$, $D_{10}$ and $D_{11}$. These binary values will be used as described hereinafter during phase 2 of mode 3.

A mode 3 phase 2 condition is signaled by AND gate 102. The inputs to AND gate 102 are the mode 3 signal from logic 72, the clock phase 2 (Clk Ph 2) signal and the output of NOR 104. NOR 104 has an output only if $D_9$, $D_{10}$, $D_{11}$ are not all binary one's and only if $D_{12}$ through $D_{17}$ are not all binary zeros.

$D_{12}$ through $D_{17}$ are paired to form three blocks or groupings of two by OR circuits 110, 112 and 114. OR 110 will have an output if either $D_{12}$ or $D_{13}$ contains a binary one. OR 112 will have an output if either $D_{14}$ or $D_{15}$ contain a binary one. OR 114 will have an output if either $D_{16}$ or $D_{17}$ contain a binary one.

NOR 108 monitors the output of the paired blocks and has an output itself if OR circuits 110, 112 and 114 all have zero outputs. AND gate 106 monitors $D_9$, $D_{10}$ and $D_{11}$ and has an output only if $D_9$ through $D_{11}$ are all binary one's. NOR 104 then collects the output from AND 106 and NOR 108 and has an output only if there is zero output from both AND 106 and NOR 108. Thus a one output from NOR 104 means that $D_9$ through $D_{11}$ are not all 1's and $D_{12}$ through $D_{17}$ are not all 0's. This is the phase 2 mode 3 condition and if it is mode 3 at Clk Ph 2 time AND 102 will have an output. This mode 3 phase 2 signal is used to enable gate 116, to switch invert switch 78 and to enable AND gates 118 and 120.

Enabling invert switch 78 means that the inverted data bit pattern from $D_1$ through $D_8$ in shift register 70 is applied to bit positions 1 through 8 in the address register 76. Enabling AND gate 118 means that at Clk Ph 2 time plus $\Delta t_1$ (Clk Ph $2+\Delta t_2$) address register 76 will be set to the value on the input lines to the address register. $\Delta t_1$ is a timing pulse occurring some time during duration of Clk Ph 2. Enabling AND gate 120 means that at Clk Ph $2+\Delta t_2$ time (shortly after Clk Ph $2+\Delta t_1$) $\Delta V_{CE}$ register 122 will be loaded with the compensation value addressed at Clk Ph $2+\Delta t_1$ time. Enabling gate 116 means that the paired grouping output from $D_{12}$ through $D_{17}$ is passed by gate 116 through OR's 82, 84 and 86 to the address register 76. These bits are the address inputs for bits 9, 10 and 11 in the address register 76 during the phase 2 or second level addressing.

In summary, the second level address for the read only memory 74 is the trailing bit $D_0$, the inverted data pattern for $D_1$ through $D_8$ and the paired groupings from $D_{12}$ through $D_{17}$. At Clk Ph $2+\Delta t_2$ time, AND gate 120 will have an output since it has been enabled by AND gate 102. This output from AND gate 120 sets $\Delta V_{CE}$ register to load the nine bits of compensated stored at the address accessed during the second level addressing. Thus, in mode 3 at the end of clock phase 2, the $V_{CE}$ register 98 contains a compensation value and the $\Delta V_{CE}$ register 122 also contains values for compensating the charged drop.

The values in the $\Delta V_{CE}$ register are divided into three portions. Memory 74 has a nine-bit output so these nine bits may be divided into three groups of three bits and stored in $\Delta V_{CE}$ register 122. One of the three bit values in register 122 will be added to the $V_{CE}$ nine bit value in register 98 by the digital adder 124. Which one of the three bit values in register 122 is added depends upon the contents of register 96.

Register 96 is analyzed by the $\Delta V_{CE}$ logic 126. Depending upon whether the number of one's in print data bits $D_9$, $D_{10}$ and $D_{11}$ is 0, 1 or 2, gate 128 will gate one of the three bit values in register 122 to the digital adder 124. The selected $\Delta V_{CE}$ compensation value is added to the $V_{CE}$ compensation value and passed to the digital-to-analog converter 130. The output of the converter 130 goes to the switch 24 which performs the same function as described in FIG. 1.

To summarize mode 3, if the number of binary one's in bits $D_1$ through $D_8$ are less than or equal to 3 and bits $D_9$, $D_{10}$ and $D_{11}$ are all one's or bits $D_{12}$ through $D_{17}$ are all zeros, the pattern is sufficiently isolated that the memory 74 is addressed by the trailing bit and bits $D_1$ through $D_{11}$. However, if the bits $D_9$ through $D_{11}$ are not all one's and the bits $D_{12}$ through $D_{17}$ are not all zeros, various patterns of compensation will occur. The strength of the bridging of compensation effects from $D_1$–$D_8$ to $D_{12}$–$D_{17}$ will depend upon the number of one's in $D_9$, $D_{10}$ and $D_{11}$. Accordingly, a $\Delta V_{CE}$ compensation is added to a $V_{CE}$ compensation by two-level addressing of memory 74. The values for the $V_{CE}$ in the first level depend upon the data pattern from $D_1$ through $D_{11}$ while the values for the second level for the $\Delta V_{CE}$ increments depend upon the data pattern in $D_{12}$ through $D_{17}$ grouped in pairs and the strength of the bridging as represented by the number of binary one's in $D_9$, $D_{10}$ and $D_{11}$.

In the first level of addressing, a 9-bit word read from the memory 74 defines the value for $V_{CE}$. In the second level of addressing, the 9-bit word read from memory is partitioned into three 3-bit words-one three bit word for each $\Delta V_{CE}$ increment. Thus, the second level 9-bit word is partitioned so that there is a 3-bit incremental compensation word for each of the three possible bridging effects ($D_9$, $D_{10}$ and $D_{11}$ contain 0, 1 or 2 binary ones).

Note that the $\Delta V_{CE}$ register 122 is reset at Clk Ph $1+\Delta t_2$ time. Accordingly, register 122 is reset to zeros near the end of each Clk Ph 1 time. Therefore, register 122 will have values in it only if there is a mode 3 phase 2 condition as indicated by AND 102. Under all other conditions the compensation value applied to the converter 130 is represented only by the digital value in $V_{CE}$ register 98.

In the above described manner, FIG. 6 implements the waveform $N_T=8(3:5)$ shown in FIG. 4. As described earlier, this print error distribution produces an improvement in the worst case condition and, thus, an improvement to the eye of an observer of the printed document.

Figure 7:
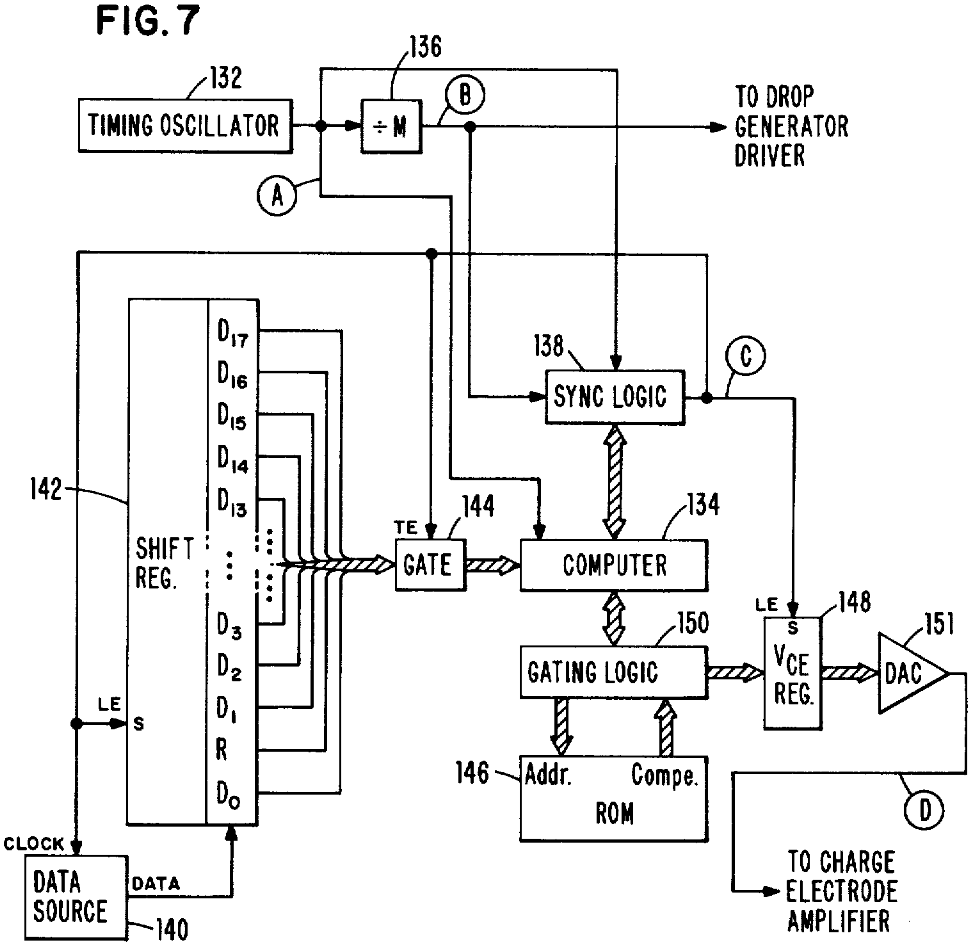
FIG. 7 shows another embodiment of the invention using a computer to implement the grouping or blocking of print data patterns for compensation effect.
Figure 8:
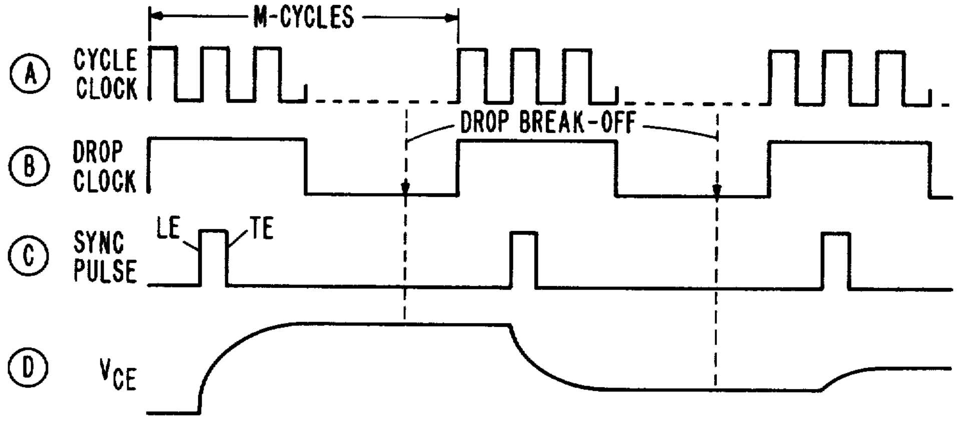
FIG. 8 is a timing diagram with examples of waveforms appearing in the embodiment of FIG. 7.

Each of the preceding embodiments may be implemented by use of a computer. A computer controlled system to retrieve the compensation values to be applied to the charged electrode amplifier is shown in FIG. 7. Waveforms occurring in FIG. 7 and illustrative of the timing of the system are shown in FIG. 8.

In FIG. 7, timing for the system is provided by the timing oscillator 132. Oscillator 132 generates a cycle clock signal (waveform A of FIG. 7) which is used to control the cycles of computer 134. The cycle clock signal is divided by a frequency divider 136 to generate a drop clock signal (waveform B FIG. 8). The division factor M for the frequency divider circuit 136 is selected to provide the desired drop frequency and also to allow the computer sufficient time during a drop cycle to find the compensation value to be used during the next drop cycle.

Sync logic 138 is controlled by computer 134 to generate a sync pulse (waveform C of FIG. 8) to synchronize the system with the time of occurrence of drop breakoff of the ink droplet from the ink stream. Waveform D in FIG. 8 is an example of the charge electrode voltage building up during each cycle between sync pulses. Sync logic 138 under control of computer 134 generates the sync pulse at a time sufficiently ahead of the drop breakoff time to allow the charge electrode voltage to build to a stable level. Typically, the sync pulse will be generated such that it occurs during the first one-fourth of the drop cycle while the drop breakoff point occurs approximately three-fourths of the period through the drop cycle.

The sync pulse is used as a clocking pulse for the data source 140 and shift register 142. Serial data from the data source is shifted into the shift register 142 by the leading edge (LE) of the sync pulse. The trailing edge (TE) of the sync pulse enables gate 144 to pass print data bits $D_0$ and $D_1$ through $D_{17}$ to computer 134 for analysis. Thus, the leading edge of the sync pulse is used to shift data into the shift register 142 and the trailing edge is used to gate that data in parallel to the computer.

The computer 134 analyzes the print data pattern to retrieve the compensation value from the read only memory 146 before the leading edge of the next sync pulse transfers the compensation value into the $V_{CE}$ register 148.

Computer 134 contains a processor and a memory. The computer is program controlled to implement the group blocking of the print data into a pattern which can be used to address the read only memory 146. Gating logic 150 is controlled by the computer to pass the addresses generated by the computer to address the read only memory. Gating logic 150 is also controlled by the computer to access the compensation value stored in the read only memory as addressed and to operate on that compensation value as dictated by the program. The final compensation value is then gated under computer control to the register 148.

The register 148 is set to the digital value for the charge electrode voltage by the leading edge of the sync pulse. Since computation time is predetermined to be less than the time between sync pulses, the charge electrode voltage is computed during one cycle between sync pulses and used during the next cycle between the sync pulses.

The microcomputer 134 can also be used to store a digital value for the gutter voltage. Thus, in the event that the reference bit R is a no print or zero bit, the computer 134 gates the digital value of the gutter voltage through the gating logic 150 to the register 148. At the leading edge of the next sync pulse, the gutter voltage value is loaded into register 148. The digital-to-analog converter 151 then applies the gutter voltage value to the charge electrode amplifier. If the reference drop R is a print drop, the compensation value will be loaded into register 148, converted by converter 151 to an analog signal and applied to the charge electrode amplifier.

The advantage of the apparatus in FIG. 7 is that computer 134 can be programmed to implement a number of print data grouping or print data blocking techniques to address the memory 146 for compensation values. One example of program control of the computer 134 to implement the embodiment previously described for FIGS. 5 and 6 is illustrated by the program flowcharts in FIGS. 9 and 10. When programmed in accordance with these flowcharts, the computer 134 will dynamically change the group blocking of the print data in accordance with the three modes previously discussed with reference to FIGS. 4 and 5. Any number of computing systems could be used so long as they are fast enough to complete the addressing within the period of one drop cycle (about 10 μsec.).

Figure 9:
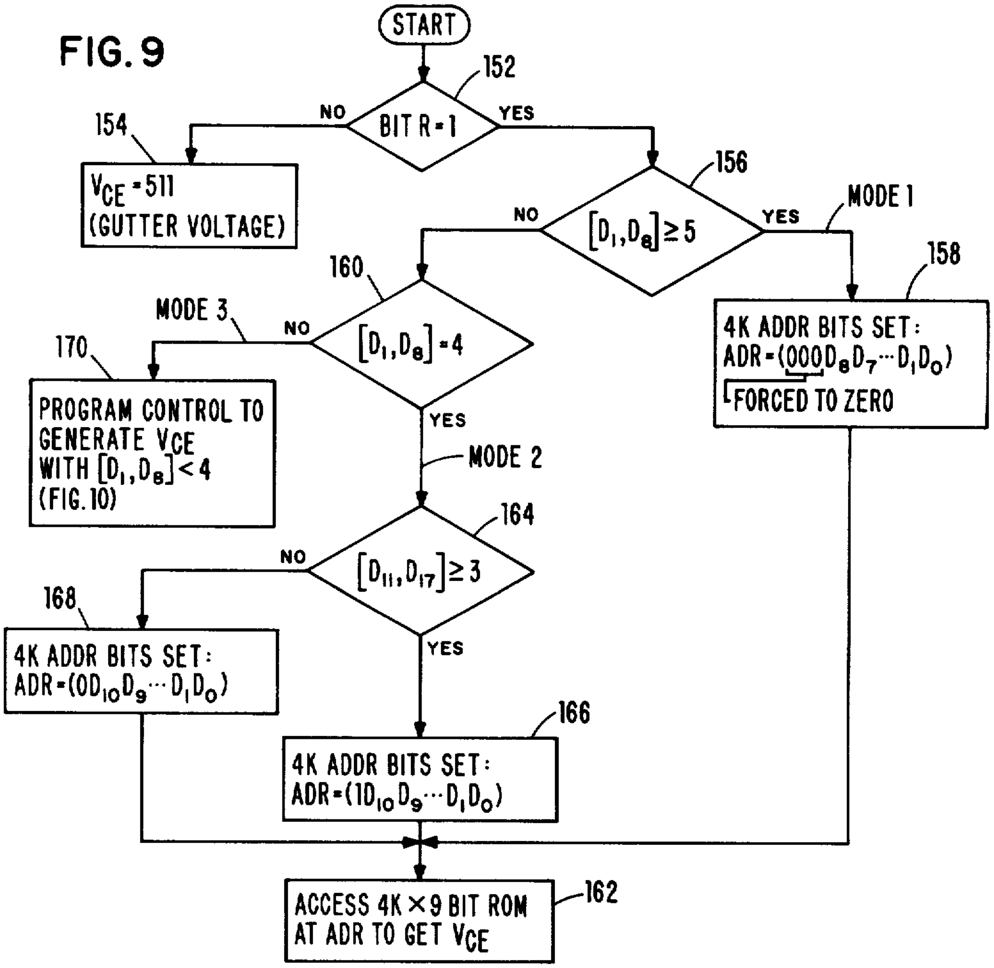
FIGS. 9 and 10 show program flow diagrams indicating program control for the computer in FIG. 7 to implement the dynamic grouping or blocking of print data patterns of FIG. 5.

Referring now to FIG. 9, the program starts by checking the reference drop R to determine whether it is a print drop or a gutter drop. If the reference drop is a binary zero, decision block 152 passes control to block 154. Operation block 154 controls the computer to provide a digital value $V_{CE}$ equal to the count 511. The count 511 corresponds to the nine bit digital value of the gutter voltage. Accordingly, when the $V_{CE}$ register 148 (FIG. 7) is next loaded by the sync pulse, the 511 count would be passed into the register.

If the reference drop is a binary one, program control passes to decision block 156. Decision block 156 is the mode 1 decision block. If the number of binary one's for print data bits $D_1$ through $D_8$ is greater than or equal to 5, program control branches to mode 1 implemented by operation block 158. If the number of binary one's in $D_1$ through $D_8$ is less than 5, program control passes to decision block 160 to make the decision between mode 2 and mode 3.

In mode 1, operation 158 sets the 4K address for the read only memory to the binary values for $D_0$ through $D_8$ and forces the three highest address bit positions to zero. Program control passes then to operation block 162 where the mode 1 address is used to access the charge electrode voltage from the read only memory. At the next sync pulse this charge electrode value would be loaded into register 148 in FIG. 7.

Mode 2 operation occurs if the decision block 160 indicates the number of binary one's in $D_1$ through $D_8$ is equal to 4. The program control then passes to decision block 164. Decision block 164 represents the group analysis of print data bits $D_{11}$ through $D_{17}$. If the number of binary one's in $D_{11}$ through $D_{17}$ is equal to or greater than 3, the program passes to operation block 166. If the number of one's in $D_{11}$ through $D_{17}$ is less than 3, the program passes to operation block 168. In operation 166, the address bits are set to the values for data bits $D_0$ through $D_{10}$, and the eleventh bit position is set to binary 1 representing data bits $D_{11}$ through $D_{17}$ as a group. Operation 168 sets the address to the data bits for $D_0$ through $D_{10}$ and the eleventh bit is set to a binary 0 representing the group of data bits $D_{11}$ through $D_{17}$. The mode 2 address from either block 166 or 168 is used by operation block 162 to access the read only memory to obtain the charge electrode voltage. This mode 2 charge electrode voltage is then loaded into the register 148 (FIG. 7) during the next sync pulse.

Mode 3 operation is indicated by a negative decision by decision block 160 in FIG. 9. If the decision blocks 156 and 160 both produce negative results, then the number of binary one's in $D_1$ through $D_8$ must be less than or equal to 3 which is the mode 3 condition. The mode 3 operation 170 in FIG. 9 is diagrammed in detail in FIG. 10.

Figure 10:
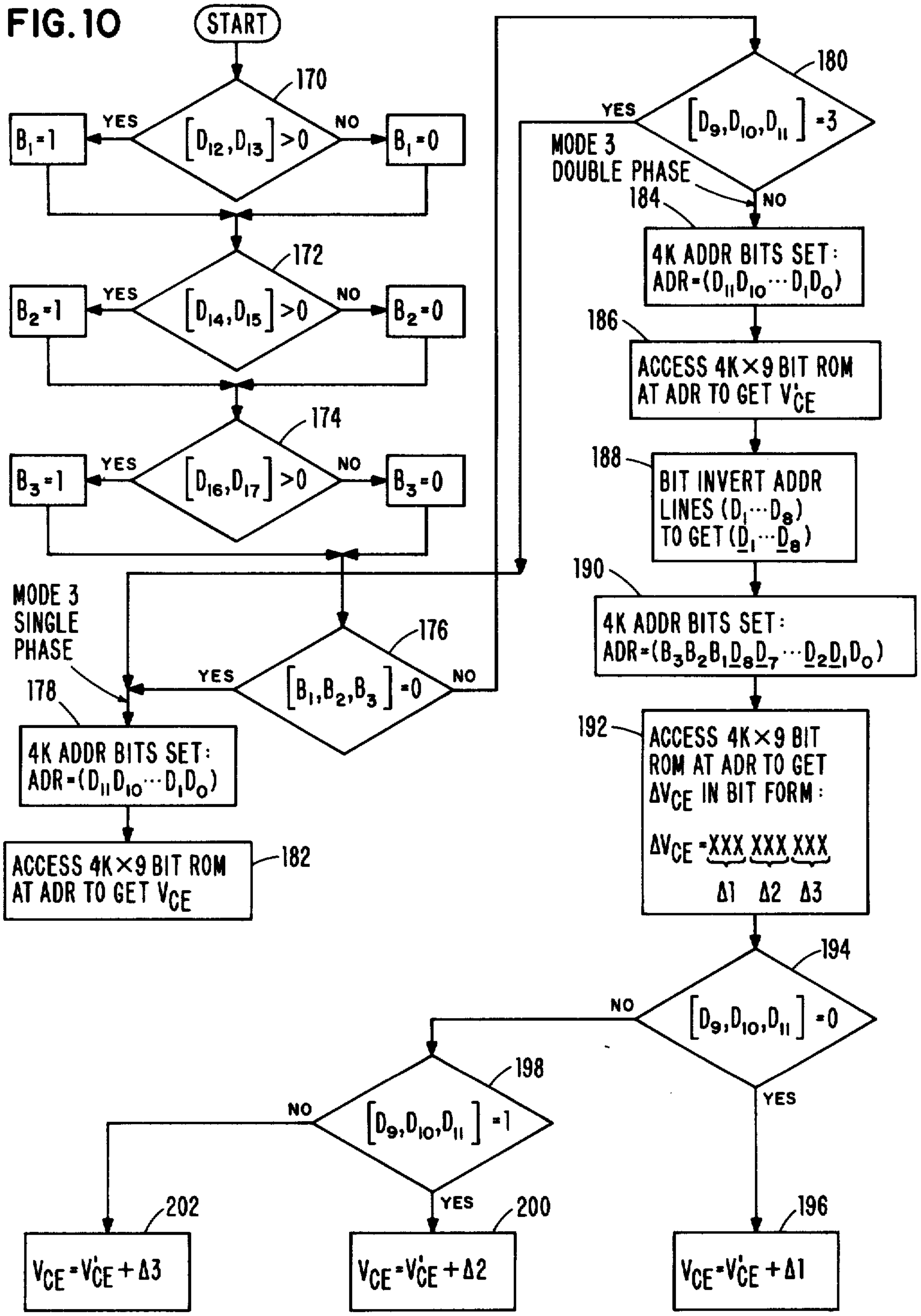

In FIG. 10, the mode 3 operation starts by blocking or grouping the data bits pairs $D_{12}$ with $D_{13}$, $D_{14}$ with $D_{15}$, and $D_{16}$ with $D_{17}$. If $D_{12}$ or $D_{13}$ or both contain a binary one, then decision block 170 sets a block bit $B_1$ to 1. If both $D_{12}$ and $D_{13}$ contain binary zeros, then decision block 170 sets the block bit $B_1$ to zero. Decision blocks 172 and 174 perform the same function for data bits $D_{14}$ with $D_{15}$ and $D_{16}$ with $D_{17}$, respectively. Block bit $B_2$ is set to one if $D_{14}$ or $D_{15}$ contains a binary one; otherwise, block $B_2$ equals zero. Similarly, block bit $B_3$ is set to one if $D_{16}$ or $D_{17}$ contain a binary one; otherwise, block bit $B_3$ is set to zero.

Next program flow moves to decision block 176 to determine if the number of binary one's in $B_1$ through $B_3$ is equal to zero. If it is, program flow branches to operation block 178. If it is not, program flow branches to decision block 180 to determine if the number of binary one's in data bits $D_9$ through $D_{11}$ is equal to 3. If it is, the program flow branches to operation block 178. If it is not, program flow branches to mode 3 double phase.

In mode 3 single phase, operation block 178 sets the address bits to the data bit pattern for data bits $D_0$ through $D_{11}$. Computer 134 then controls the gating logic via operation block 182. Operation 182 causes the computer to address the read only memory with the address bits set by operation 178. The charge electrode voltage obtained from the read only memory is then gated to the register 148 during the next sync pulse.

In mode 3 double phase, program flow branches from decision block 180 to operation block 184. In the first phase of the double phase operation, block 184 sets the address bits to the value of the data bits $D_0$ through $D_{11}$. This address is then used by operation 186 to access the read only memory and get charge electrode voltage $V^1_{CE}$ for phase 1.

Program control passes on to operation 188 to commence the second phase of the double-phase operation. In operation 188, the computer inverts the data bits for $D_1$ through $D_8$ and proceeds to operation 190. In operation 190, the computer sets the address bits to the bit $D_0$, the inverted data bits for $D_1$ through $D_8$, and the block bits $B_1$, $B_2$ and $B_3$ for positions 9, 10 and 11 of the address. This second phase address is then used during operation 192 to access the read only memory.

In operation 192, the 9 bits of compensation value read from the read only memory are partitioned into three sections, Δ1, Δ2 and Δ3, of three bits each. Each of these three-bit values may then be added to the $V^1_{CE}$ charge electrode voltage determined during phase 1. The addition operation depends upon the number of binary one's in the data bit positions $D_9$, $D_{10}$ and $D_{11}$. The program control flows from operation 190 to decision block 194.

If the number of binary one's in $D_9$, $D_{10}$ and $D_{11}$ is equal to zero, then decision block 194 branches the program to operation block 196. Operation 196 adds Δ1 to the charge electrode voltage $V^1_{CE}$ determined during the first phase. If the number of binary one's in $D_9$ through $D_{11}$ is not equal to 0, program control branches to decision block 198 to determine whether the number of binary one's is equal to 1 or greater than 1. If the number of binary one's in $D_9$ through $D_{11}$ is equal to 1, then the charge electrode voltage is formed by operation 200. Computer 134 in operation 200 adds the first phase charge electrode voltage $V^1_{CE}$ to Δ2 to obtain the final charge electrode voltage $V^1_{CE}$. If the number of binary one's in $D_9$, $D_{10}$ and $D_{11}$ is not equal to zero and not equal to one, the program will branch to operation block 202. In operation 202, the computer 134 adds the first phase charge electrode voltage $V^1_{CE}$ to Δ3 to form the final charge electrode voltage $V_{CE}$. As discussed earlier, these Δ charge electrode increments are different due to the different bridging effect, caused by the number of binary one's in positions $D_9$, $D_{10}$ and $D_{11}$, on the block pairs represented by binary bits $B_1$, $B_2$ and $B_3$. Once the final charge electrode voltage is determined in the double-phase operation by one of the operations 196, 200 or 202, that charge electrode voltage is loaded into the register 148 (FIG. 7) during the next sync pulse.

While FIG. 7 has been described as programmed to implement the embodiment in FIG. 6, it will be apparent to one skilled in the art that the computer could be programmed to implement any of the previous embodiments. Further, by changing the size of the shift register and the read only memory and by changing the group data bit analysis performed by the programmed computer, any number of blocking or grouping patterns might be used to address the read only memory.

Further, more or less than three modes of selection to different dynamic blocking or grouping routines could be used. For example, if the data bit pattern being monitored to make the mode selection contained an odd number of data bits, the invention might be implemented by using two modes rather than three modes. In other words, if the first seven data bits preceding the referenced drop were being monitored to make the mode selection, the memory swap could be made based on a greater-than-or-equal-to four and a less-than-or-equal-to three mode selection. There would be no middle condition between the swap and, thus, there would only be two modes selected.

Furthermore, if more data bits were being monitored, the computer might be programmed to dynamically group more data bits as a function of the bridging effect of the data bit pattern in one group on the data pattern in the next group.

While I have illustrated and described and preferred embodiments of my invention, it is understood that I do not limit myself to the precise constructions herein disclosed and the right is reserved to all changes and modifications coming within the scope of the invention as defined in the appended claims.

What is claimed is:

1. In an ink jet printer having a charge electrode and a deflection electrode to control the flight of a reference ink drop to a print media in accordance with print data for the drop, apparatus for correcting the flight path of the ink drop to reduce print position error comprising:

print data buffering means for storing the print data pattern of drops in the ink stream with the reference drop;

memory means for storing a compensation value for each of a plurality of print data patterns in the ink stream, said compensation value, when applied to said printer, compensating the flight path of the reference ink drop based upon the data pattern of the ink drops in the ink stream with the reference drops;

logic means responsive to said buffering means for grouping a portion of the print data into a portion of the address for said memory means;

addressing means responsive to said buffering means and to said logic means for addressing said memory means based upon a portion of the print data directly and the remaining portion of the print data indirectly as grouped by said logic means;

said memory means in response to said addressing means reading the compensation value to said ink jet printer so that said printer can correct the flight path of the reference ink drop.

2. The apparatus of claim 1 wherein said logic means comprises a plurality of grouping means responsive to said buffering means, each grouping means for grouping multiple portions of the print data into multiple portions of the address for said memory means.

3. The apparatus of claim 2 wherein each of said grouping means groups a larger portion of print data into an address portion as such portion of print data becomes more remote in position in the ink stream relative to the reference ink drop.

4. The apparatus of claim 2 wherein each of said grouping means comprises:

means for determining the number of ink drops in its print data portion that are in the flight path of the print media;

means responsive to the number determined by said determining means for setting the address value for its print data portion.

5. Compensation apparatus for correcting the flight path of ink drops in a binary ink jet printer having a charge electrode and a deflection electrode to control the flight path of the ink drops whereby, if the drop is a print drop, a print data bit controls the charge on the charge electrode and, if the drop is a no-print or gutter drop, a gutter data bit controls the charge on the charge electrode, said compensation apparatus comprising:

first storage means for storing a charge compensation value for the drop being charged, said compensation value being a function of the data bit pattern for ink drops in the ink stream with the drop being charged;

temporary storage means for storing the data bit pattern corresponding to the stream of ink drops currently being controlled by the ink jet printer;

analyzing means for analyzing a block of data bits in the data bit pattern in said temporary storage means and generating a partial address for said first storage means;

address means for forming the address for said first storage means with the temporarily stored data bits outside the analyzed block of data bits and with the partial address from said analyzing means;

said first storage means responsive to the address formed by said address means for reading out to the printer the compensation value for the data but pattern for the ink stream so that said printer can adjust the charge on the charge electrode to correct the flight path of the ink drop being charged.

6. The apparatus of claim 5 wherein said analyzing means generates the partial address for said first storage means based upon the number of data bits in the block that represent print drops.

7. The apparatus of claim 5 and in addition:

a plurality of analyzing means, each analyzing means analyzes a separate block of data bits in the data bit pattern in said temporary storage means and generates a separate partial address representative of its block of data bits;

said address means forms the address for said first storage means with the data bits in said temporary storage means outside the plurality of analyzed blocks and with the partial addresses generated by all of said analyzing means.

8. The apparatus of claim 7 wherein each of said analyzing means analyzes a data bit block whose size is a function of the effect that the ink drops represented by the block have on the ink drop being charged.

9. The apparatus of claim 8 wherein each of said analyzing means analyzes a size of data bit block such that the ink drops represented by each block have substantially the same magnitude of effect on the ink drop being charged as ink drops represented by each of the other blocks.

10. The apparatus of claim 7 wherein each of said analyzing means analyzes the proportion of print data bits in its data bit block and generates a single bit code for its partial address, said code representing the magnitude of the effect of the data block on the ink drop being charged.

11. The apparatus of claim 5 wherein:

said temporary storage means comprises a shift register having a stage for each data bit in the data bit pattern and bits are shifted from stage to stage once each drop cycle;

said address means forms the address for said first storage means after each shift of the data bits in said shift register and before the drop being charged is charged during the drop cycle.

12. A method for reducing print errors in a charged drop ink jet printer where the flight of the drops is controlled by print data for the drops and such errors are due to distortions in the flight path of the drop to the print media, said method comprising the steps of:

monitoring the print data pattern of drops in the current stream of drops from the printer;

grouping a portion of the monitored data pattern into a block of data;

combining the data in the block of data into a code representative of the print data in the block;

retrieving a stored predetermined compensation value for use by the printer to control the flight path of the drop being charged, said compensation value being based in part on the monitored data pattern not blocked together by said grouping step and in part on the code representing the print data in the block.

13. The method of claim 12 wherein the portion of the monitored data pattern grouped into a block by said grouping step is the portion representative of the ink drops most remote in position in the ink stream relative to the drop being charged.

14. The method of claim 12 wherein:

said grouping step groups a plurality of separate portions of the monitored print data pattern into multiple blocks of data;

said combining step combines the data in each block into a code representative of the print data in that block;

said retrieving step retrieves a compensation value based in part on each of the codes representative of the print data in each of the blocks.

15. The method of claim 14 wherein the portions of the monitored data pattern which are grouped are the portions representative of the ink drops most remote in position in the ink stream relative to the drop being charged.

16. The method of claim 15 wherein the size of each block of data grouped during said grouping step is such that the block of ink drops represented by each data block have substantially the same magnitude of effect on the ink drop being charged as the block of ink drops represented by each of the other data blocks.

17. The method of claim 16 wherein said combining step combines the data in a block into a single bit code of one value or the other depending on whether or not the number of data bits in the block, which represent drops in the flight path to the print media, is sufficient to contribute at least half the magnitude of effect on the drop being charged as the effect contributed when all of the data bits in the block represent drops in the flight path to the print media.

* * * * *